United States Patent
Lehman

(10) Patent No.: US 9,861,229 B2
(45) Date of Patent: Jan. 9, 2018

(54) MOVEABLE DOOR FOR VERTICAL COOKING GRILL

(71) Applicant: Lon Lehman, Ft. Wayne, IN (US)

(72) Inventor: Lon Lehman, Ft. Wayne, IN (US)

( * ) Notice: Subject to any disclaimer, the term of this patent is extended or adjusted under 35 U.S.C. 154(b) by 538 days.

(21) Appl. No.: 14/522,466

(22) Filed: Oct. 23, 2014

(65) Prior Publication Data

US 2015/0107464 A1 Apr. 23, 2015

Related U.S. Application Data

(60) Provisional application No. 61/894,632, filed on Oct. 23, 2013.

(51) Int. Cl.
*A47J 37/06* (2006.01)

(52) U.S. Cl.
CPC ................ *A47J 37/0611* (2013.01)

(58) Field of Classification Search
CPC combination set(s) only.
See application file for complete search history.

(56) References Cited

U.S. PATENT DOCUMENTS

| | | | |
|---|---|---|---|
| 2,552,135 A * | 5/1951 | Bertino | A47J 37/0821 99/329 RT |
| 4,066,862 A | 1/1978 | Tippmann | |
| 4,149,840 A | 4/1979 | Tippmann | |
| 4,299,060 A | 11/1981 | Tippmann | |
| 4,421,015 A * | 12/1983 | Masters | A21B 2/00 426/243 |
| 4,547,995 A | 10/1985 | Tippmann | |
| 4,767,581 A | 8/1988 | Tippmann | |
| 4,864,788 A | 9/1989 | Tippmann | |
| 5,004,617 A | 4/1991 | Bowen et al. | |
| 5,086,693 A | 2/1992 | Tippmann | |
| 5,201,364 A | 4/1993 | Tippmann | |
| 5,235,903 A | 8/1993 | Tippmann | |
| 5,318,792 A | 6/1994 | Tippmann | |
| 5,411,753 A | 5/1995 | Tippmann | |
| 5,522,310 A * | 6/1996 | Black, Sr. | A47J 27/14 221/113 |
| 5,662,959 A | 9/1997 | Tippmann | |
| 5,680,810 A | 10/1997 | Sham | |
| 5,767,487 A | 6/1998 | Tippmann | |
| 5,921,172 A | 7/1999 | Kiczko et al. | |
| 5,939,125 A | 8/1999 | Tippmann | |

(Continued)

FOREIGN PATENT DOCUMENTS

| | | |
|---|---|---|
| JP | 7289444 A | 11/1995 |
| JP | 2004-209161 A | 7/2004 |
| KR | 10-0364682 A | 7/2001 |

OTHER PUBLICATIONS

International Search Report and Written Opinion of the International Searching Authority; PCT/US2009/064388; dated Jun. 28, 2010.

*Primary Examiner* — Anne M Antonucci
*Assistant Examiner* — Renee M Larose
(74) *Attorney, Agent, or Firm* — Studebaker & Brackett PC

(57) ABSTRACT

The disclosure provides a movable door that directs debris, such as oil, grease, and food particles, that falls from a plurality of cooking slots in a vertical cooking grill to an area separate from a food product delivery tray, providing a cooked food product with reduced calories that is potentially more visually appealing.

20 Claims, 4 Drawing Sheets

(56) References Cited

U.S. PATENT DOCUMENTS

| | | |
|---|---|---|
| 5,960,869 A | 10/1999 | Tippmann |
| 5,990,452 A * | 11/1999 | Shelton ............... A47J 37/0842 |
| | | 126/190 |
| 5,993,878 A | 11/1999 | Tippmann |
| 6,062,129 A | 5/2000 | Tippmann |
| 6,103,289 A | 8/2000 | Tippmann |
| 6,145,431 A | 11/2000 | Tippmann |
| 6,152,024 A | 11/2000 | Tippmann |
| 6,263,963 B1 | 7/2001 | Tippmann |
| 6,498,329 B1 * | 12/2002 | Gibernau ................ G07F 9/105 |
| | | 219/753 |
| 6,539,839 B1 | 4/2003 | Tippmann |
| 6,639,187 B2 | 10/2003 | Arel et al. |
| 6,753,025 B1 | 6/2004 | Tippmann |
| 7,217,906 B2 * | 5/2007 | Veltrop ............... A47J 37/0857 |
| | | 219/386 |
| 7,348,519 B2 | 3/2008 | Federspeil et al. |
| 7,530,473 B2 * | 5/2009 | Chirnomas ............. G07F 9/105 |
| | | 221/123 |
| 7,538,300 B1 | 5/2009 | Tippmann, Jr. et al. |
| 7,677,160 B2 | 3/2010 | Tippmann, Sr. et al. |
| 8,367,977 B2 * | 2/2013 | Lehman .................. A47J 27/04 |
| | | 219/386 |
| 2005/0109218 A1 | 5/2005 | Arnedo et al. |
| 2005/0204927 A1 | 9/2005 | Boyle et al. |

\* cited by examiner

MOVEABLE DOOR FOR VERTICAL COOKING GRILL

CROSS-REFERENCE TO RELATED APPLICATIONS

This application claims the benefit of priority to U.S. Provisional Patent Application No. 61/894,632, filed on Oct. 23, 2014, which is hereby incorporated by reference in its entirety.

TECHNICAL FIELD

This disclosure relates to vertical cooking grills.

BACKGROUND

Vertical cooking grills provide a compact arrangement for efficient, high-volume cooking of food. During the cooking process, oils or grease from the cooked food flows downward onto an exit door of the grill and then onto a tray that receives cooked food.

SUMMARY

This disclosure provides a cooking unit comprising a food product delivery area, a cooking slot, and a flexible door. The flexible door is configured to have a first position to block a direct vertical path from the cooking slot to the food product delivery area, and a second position wherein a path exists for a food product to move from the cooking slot to the food delivery area.

This disclosure also provides a cooking unit comprising a food product delivery area, a plurality of vertically oriented cooking slots, and a flexible door. The flexible door is positioned to block falling grease, oil, and/or other debris from falling from the plurality of vertically oriented cooking slots directly into the food product delivery area during cooking and is positioned to permit the movement of food product to the food product delivery area at the completion of cooking.

This disclosure also provides a cooking unit, comprising a food product delivery area, a plurality of vertically orient cooking slots, and a flexible door. The flexible door is positioned to block at least one of a grease, an oil, and/or an other debris from falling from the plurality of vertically oriented cooking slots directly into the food product delivery area during cooking, and positioned to permit the movement of food product to the food product delivery area at the completion of cooking.

Advantages and features of the embodiments of this disclosure will become more apparent from the following detailed description of exemplary embodiments when viewed in conjunction with the accompanying drawings.

DETAILED DESCRIPTION

Figure 1:
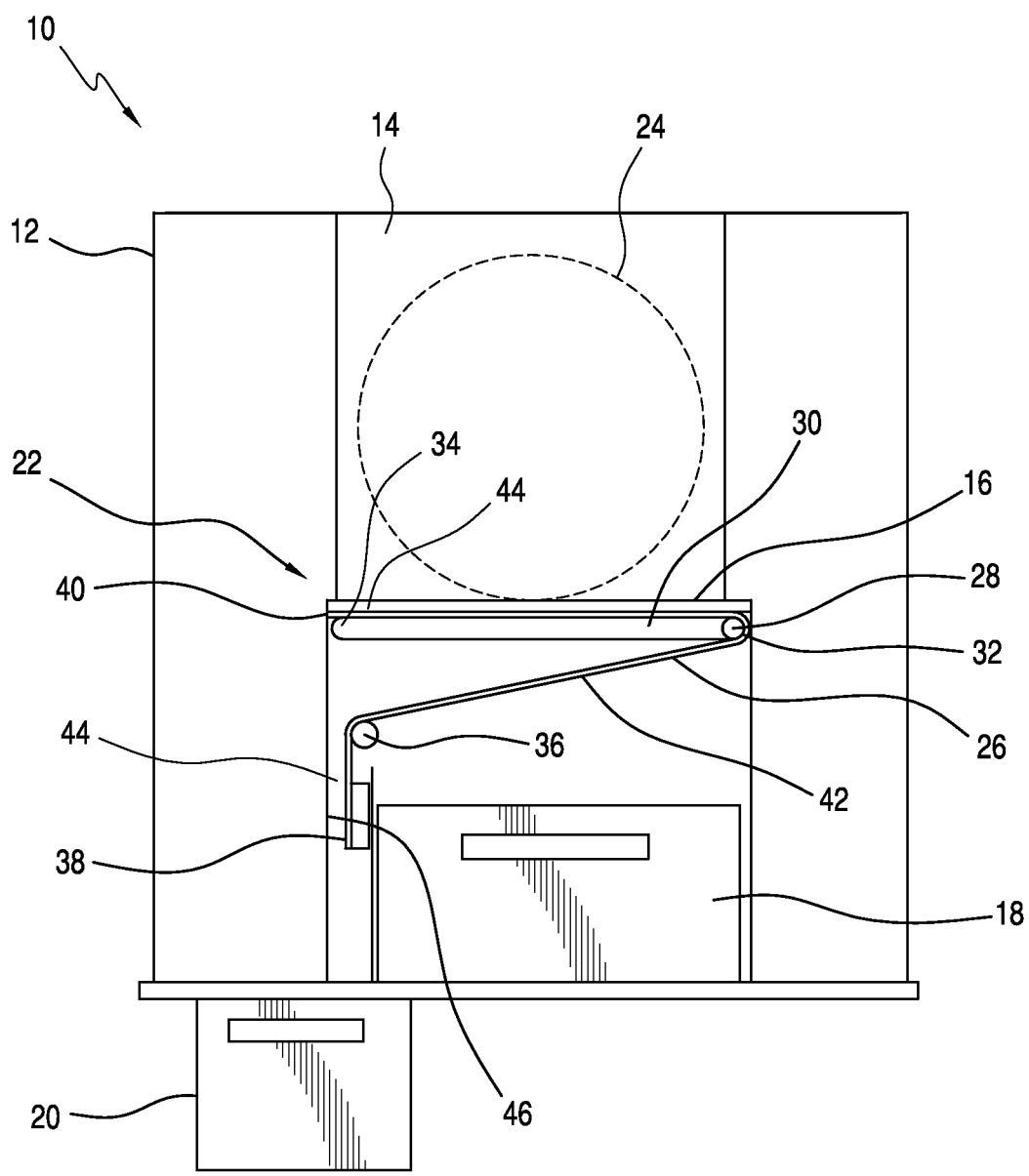
FIG. 1 is a front view of a vertical grill with a moveable door in position during a cooking operation of the vertical grill.
Figure 2:
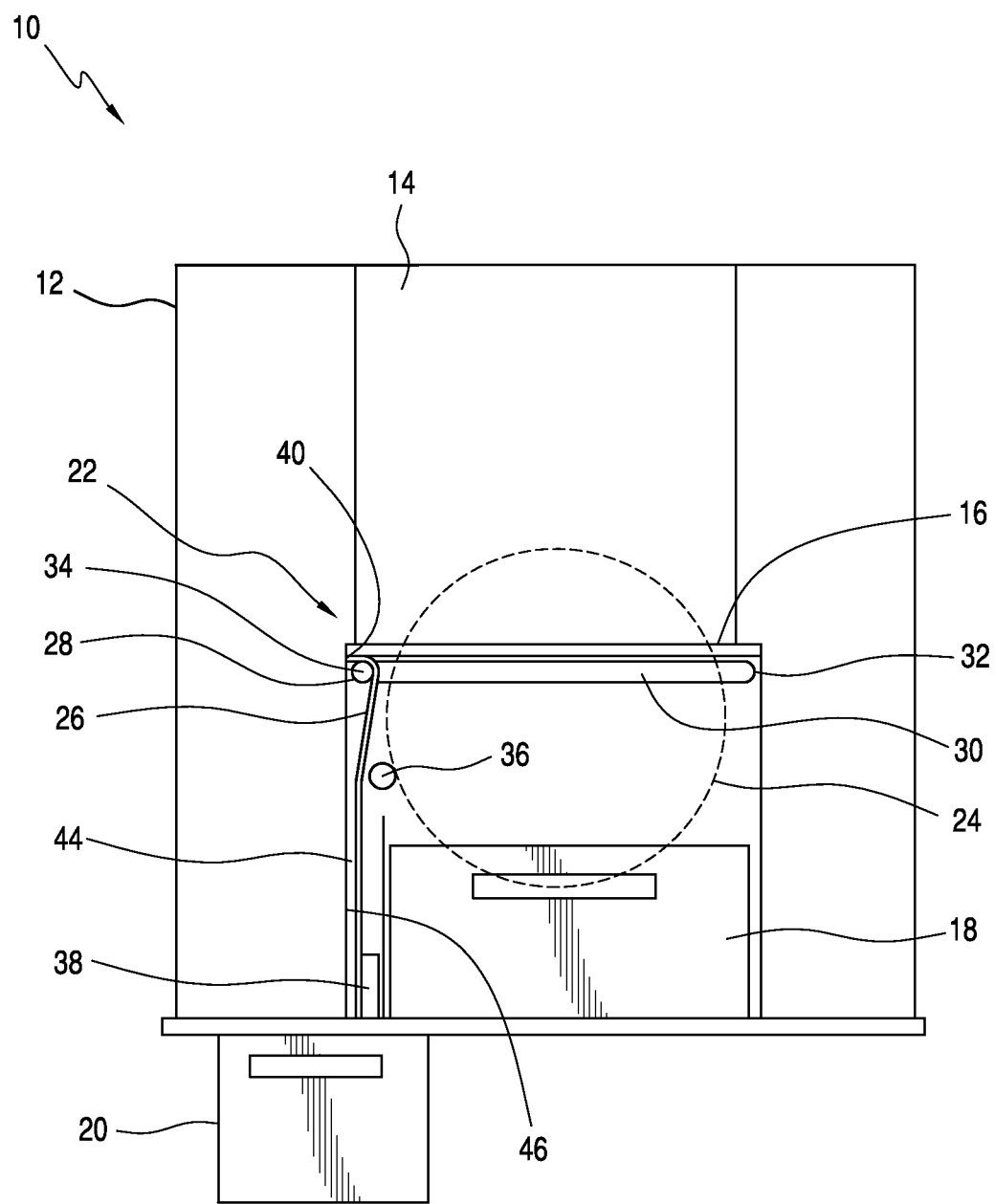
FIG. 2 is a front view of the vertical grill of FIG. 1 with the moveable door retracted to permit unloading of a food product from the vertical grill.

Referring to FIGS. 1 and 2, a vertical cooking grill or unit is shown and generally indicated at 10. Vertical cooking grill 10 is typically used in environments requiring high volumes of cooked food or food product, such as in cafeterias, fast food restaurants, and the like. While vertical cooking grills provide many advantages in fast, efficient cooking of food product, one challenge with vertical grills is separating oil or grease from cooking food from the cooked food during a delivery process. In current vertical grills, oil and/or grease from cooking food product falls vertically onto a food product delivery tray or feature. Thus, when cooked food product is released to the food product delivery tray, the cooked food product falls directly into the oil, grease, and other debris that is a byproduct of the cooking process. The debris falling in such a manner is often seen as contamination, either adding an undesirable visual appearance to the cooked food product or adding unnecessary and undesirable fat calories to the cooked food product. The movable door of the present disclosure directs some or all of the debris, such as oil, grease, and food particles, to an area separate from the food product delivery tray, providing a cooked food product with reduced calories that is potentially more visually appealing.

Vertical cooking grill 10 includes a housing 12 in which are positioned a plurality of cooking slots 14, a trap door 16, a food product delivery tray, finished product receiving area, or food product delivery feature 18, a grease pan 20, and a movable door system 22. Vertical cooking grill 10 may be similar to the grill shown in U.S. Pat. No. 8,367,977, the entire content of which is incorporated herein by reference in its entirety. Cooking slots 14 are oriented in a vertical direction and are configured to hold a food product 24. Once food product 24 is cooked, trap door 16, which includes a plurality of openings 48, is moved transversely or horizontally from a closed position to an open position where openings 48 permit cooked food product to fall under the influence of gravity onto food product delivery tray 18, or to exit cooking slot 14.

In the exemplary embodiment, vertical cooking grill 10 includes movable door system 22, which includes a flexible door 26, a top or movable rod 28 over which flexible door 26 extends or is draped, a pair of tracks 30 in which movable rod 28 slides between a first position 32 and a second position 34, a fixed rod 36, and a weight or other tensioner 38. Flexible door 26 is fabricated from a sheet of flexible, food grade material. In an exemplary embodiment, the food grade material is a sheet of Teflon.

Figure 3:
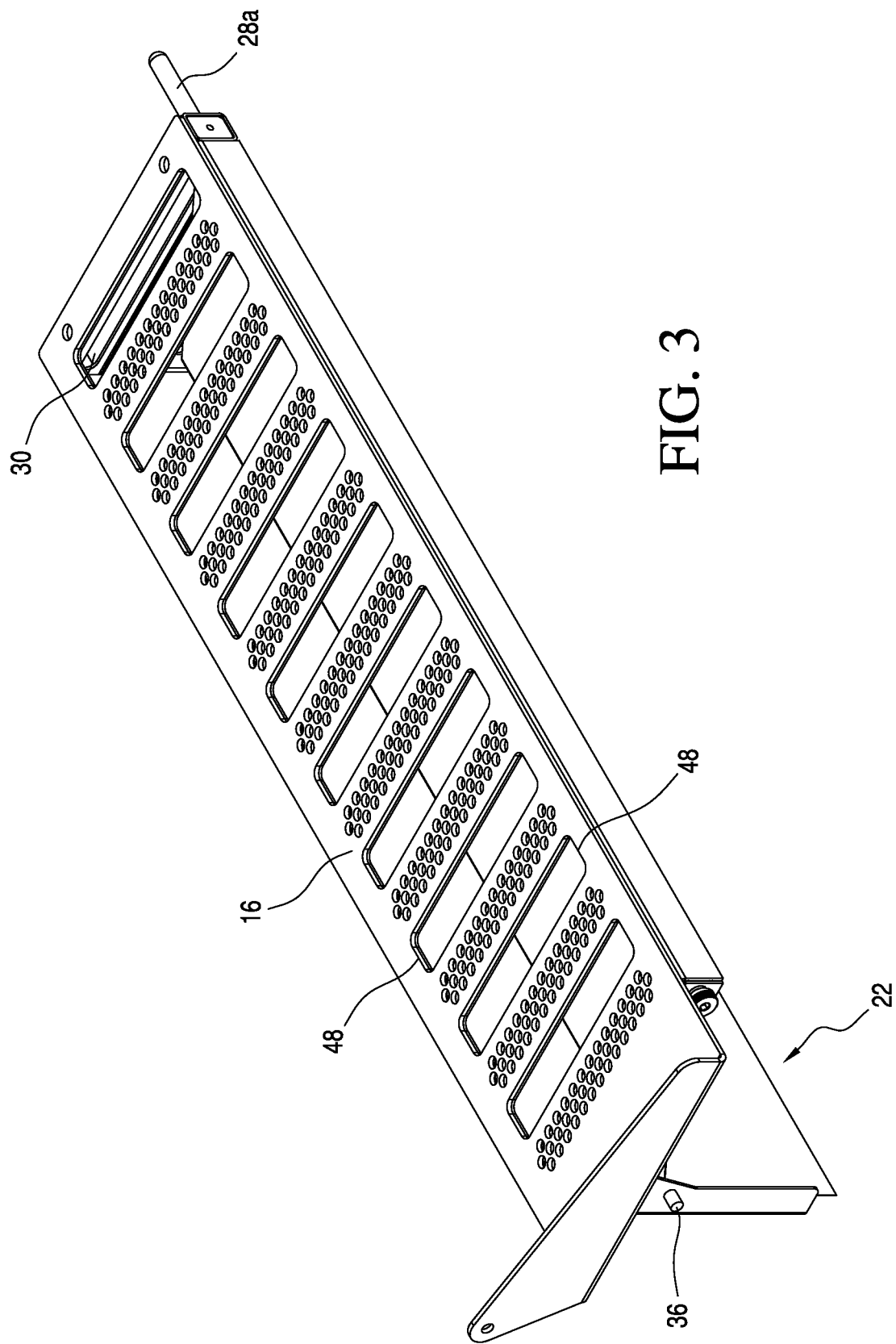
FIG. 3 is an upper perspective view of a slotted trap door of the vertical grill of FIG. 1 with a second exemplary embodiment moveable door of the present disclosure.
Figure 4:
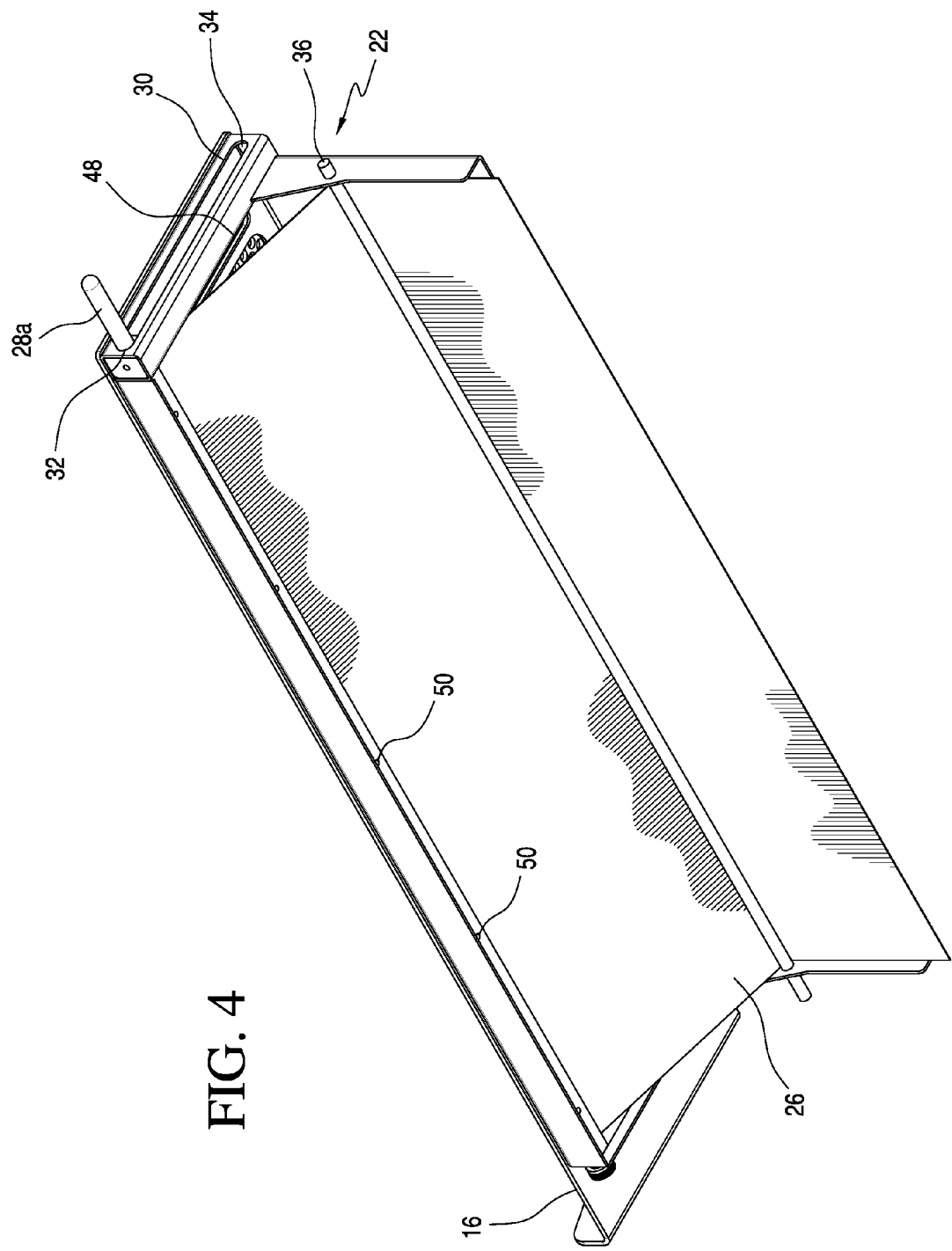
FIG. 4 is a lower perspective view the embodiment of FIG. 3.

In the exemplary embodiment of FIGS. 1 and 2, the sheet of Teflon is fixedly attached to vertical cooking grill at an anchor location 40, and then routed over movable rod 28, and then around fixed rod 36. In a second exemplary embodiment, shown in FIGS. 3 and 4, flexible door 26 is attached to moveable rod 28a, which thus becomes the anchor location in this embodiment. Such attachment may be by fasteners 50, which may be screws, rivets, bolts, etc., or through a mechanical arrangement, such as crimping or clamping. Tracks 30 are horizontally oriented and are attached to trap door 16 along a first or front side and along a second or back side in a location such that movable rod 28 presses the material of flexible door 26 against an underside of trap door 16 as movable rod 28 traverses from first position 32 to second position 34. The end of flexible door 26 that extends vertically below fixed rod 26 receives weight or other tensioner 38, which keeps flexible door 26 against movable rod 28 and fixed rod 36 as movable rod 28 moves between first position 32 and second position 34 along track 30 in FIGS. 1 and 2, and against fixed rod 36 as movable rod 28a moves between first position 32 and second position 34 along track 30 in FIGS. 3 and 4.

Movable rod 28 moves between first position 32 and second position 34 under the manual action of an operator, or by the power of an actuator (not shown). Movable rod 28 is shown in first position 32 in FIG. 1. When movable rod 28 is in first position 32, a direct vertical line or path between cooking slot 14 and food product receiving area 18 is blocked, as shown in FIG. 1. Because movable door 26 is interposed directly between cooking slot 14 and food receiving area 18, as food product 24 cooks, oil, grease, and other debris from the cooking process falls vertically onto trap door 16 and onto flexible door 26, when such debris falls through openings 48 in trap door 16. Liquid debris such as oil and/or grease flow onto flexible door 26. Once the cooking process is complete, an actuator changes the position of movable rod 28 from first position 32 to second position 34. As movable rod 28 traverses the underside of trap door 16, either movable rod 28 (FIGS. 3 and 4) or the proximity of flexible door 26 to the underside of trap door 16 by being between trap door 16 and moveable rod 28 (FIGS. 1 and 2) wipes oil, grease, and/or other debris from the underside of trap door 16, causing the oil and/or grease and other debris to flow along an upper angled surface 42 of flexible door 26 or through gaps in flexible door 26 adjacent to where flexible door 26 attaches to vertical cooking grill 10. Debris from the cooking process flows along a debris channel 44 located between a vertical portion of flexible door 26 that is vertically below or under fixed rod 36 and an interior or inner wall 46 of housing 12. The debris continues to flow vertically into grease pan 20, which is removed periodically for disposal of the debris and cleaning of grease pan 20.

As movable rod 28 traverses from first position 32 to second position 34, weight or tensioner 38 keeps flexible door 26 under tension, which enables flexible door 26 to maintain contact with movable rod 28 and fixed rod 36 as movable rod 28 traverses from first position 32 to second position 34, which thus moves flexible door 26, which is positioned vertically along a longitudinal line between cooking slots 14 and food product delivery tray 18 while food product 25 is cooking, into a position where flexible door 26 is no longer positioned vertically between or along a vertically extending longitudinal axis between cooking slots 14 and flexible door 26, as shown in FIG. 2. Once movable rod 28 is in second position 34, trap door 16 is actuated to move slots 48 in trap door 16 such that slots 48 are aligned with cooking slots 14, which permits cooked food product 24 to fall vertically onto food product delivery tray 18. Once food product has dropped vertically from cooking slots 14 into food product delivery tray 18, trap door 16 is closed, and movable rod 28 is restored to second position 34 from first position 32, and the cooking process is repeated with additional food product 24 delivered to cooking slots 14.

Trap door 16 and movable door system 22 are easily removable from vertical cooking grill 10 to permit cleaning of trap door 16 and the components of movable door system 22.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

I claim:
1. A cooking unit, comprising:
a food product delivery area;
a cooking slot; and
a flexible door configured to have a first position to block a direct vertical path from the cooking slot to the food product delivery area, and a second position wherein a path exists for a food product to move from the cooking slot to the food delivery area, an upper portion of the flexible door configured to move horizontally as the flexible door moves from the first position to the second position, and a lower portion of the flexible door configured to move away from the cooking slot as the flexible door moves from the first position to the second position.

2. The cooking unit of claim 1, wherein the flexible door is fabricated from a food grade material.

3. The cooking unit of claim 2, wherein the flexible door is fabricated from Teflon.

4. The cooking unit of claim 1, wherein the flexible door is moved from the first position to the second position by the movement of a movable rod.

5. The cooking unit of claim 4, wherein one end of the flexible door is attached to the movable rod.

6. The cooking unit of claim 4, wherein a second end of the flexible door is attached to a tensioner.

7. The cooking unit of claim 6, wherein the tensioner is a weight.

8. The cooking unit of claim 4, wherein one end of the flexible door is anchored to the cooking unit.

9. The cooking unit of claim 1, further including a trap door having a trap door slot, the trap door configured to be movable to permit the food product to exit the cooking slot by way of the trap door slot when the flexible door is in the second position.

10. The cooking unit of claim 1, wherein at least one of a grease, an oil, and a food debris flows along an angled surface of the flexible door to a pan when the flexible door is in the first position.

11. A cooking unit, comprising:
a food product delivery area;
a plurality of vertically oriented cooking slots;
a flexible door positioned in a first position to block at least one of a grease, an oil, and/or an other debris from falling from the plurality of vertically oriented cooking slots directly into the food product delivery area during cooking, and positioned in a second position to permit the movement of food product to the food product delivery area at the completion of cooking, the flexible door including a first portion that moves vertically away from the plurality of vertically oriented cooking slots as the flexible door moves from the first position to the second position, and a second portion that moves transversely from a first side of the plurality of vertically oriented cooking slots to a second side of the plurality of vertically oriented cooking slots as the flexible door moves from the first position to the second position.

12. The cooking unit of claim 11, wherein the flexible door is fabricated from a food grade material.

13. The cooking unit of claim 12, wherein the flexible door is fabricated from Teflon.

14. The cooking unit of claim 11, wherein the flexible door is moved between positions by the movement of a movable rod.

15. The cooking unit of claim 14, wherein one end of the flexible door is attached to the movable rod.

16. The cooking unit of claim 14, wherein a second end of the flexible door is attached to a tensioner.

17. The cooking unit of claim 16, wherein the tensioner is a weight.

18. The cooking unit of claim 14, wherein one end of the flexible door is anchored to the cooking unit.

19. The cooking unit of claim 11, further including a trap door having a plurality of trap door slots, the trap door configured to be movable to permit the food product to exit the plurality of vertically oriented cooking slots by way of the plurality of trap door slots when the flexible door is in the second position.

20. The cooking unit of claim 11, wherein at least one of the grease, the oil, and the other debris flows along an angled surface of the flexible door to a pan when the flexible door is in the position to block at least one the grease, the oil, and/or the other debris from falling from the plurality of vertically oriented cooking slots directly into the food product delivery area during cooking.

\* \* \* \* \*

UNITED STATES PATENT AND TRADEMARK OFFICE
CERTIFICATE OF CORRECTION

PATENT NO. : 9,861,229 B2  
APPLICATION NO. : 14/522466  
DATED : January 9, 2018  
INVENTOR(S) : Lon Lehman et al.

Page 1 of 1

It is certified that error appears in the above-identified patent and that said Letters Patent is hereby corrected as shown below:

On the Title Page

Item (76) insert:  
Inventor--s--: Lon Lehman, Ft. Wayne, IN (US)  
　　　　　--Eugene Tippmann, Jr., Ft. Wayne, IN (US)--

Signed and Sealed this  
Thirtieth Day of October, 2018

Andrei Iancu  
*Director of the United States Patent and Trademark Office*